United States Patent [19]
Mehalchick et al.

[11] 3,721,630

[45] March 20, 1973

[54] SULFUR MODIFIED YTTRIUM OXIDE PHOSPHOR

[75] Inventors: Emil J. Mehalchick, Towanda; James E. Mathers, Ulster; John L. Ferri, Towanda, all of Pa.

[73] Assignee: GTE Sylvania Incorporated, Seneca Falls, N.Y.

[22] Filed: Sept. 27, 1971

[21] Appl. No.: 184,236

[52] U.S. Cl. ..................252/301.4 S, 252/301.4 R
[51] Int. Cl. ..........................C09k 1/10, C09k 1/14
[58] Field of Search ......................252/301.4 S, 301.4

[56] References Cited

UNITED STATES PATENTS 3,415,757  12/1968  Wanmaker et al............252/301.4 R
3,647,707  3/1972   Gilloly et al...................252/301.4 S

*Primary Examiner*—Robert D. Edmonds
*Attorney*—Norman J. O'Malley et al.

[57] ABSTRACT

Cathodoluminescent yttrium oxide phosphors activated with less than about 4 mole percent of europium are improved by a dopant of from about 1 to about 6 percent of sulfur which is incorporated during the firing step. The phosphors are brighter than prior art phosphors with the same color, in addition to having improved physical handling characteristics.

7 Claims, No Drawings

SULFUR MODIFIED YTTRIUM OXIDE PHOSPHOR

BACKGROUND OF THE INVENTION

This invention relates to red-emitting cathodoluminescent yttrium oxide phosphors activated with europium. More particularly, it relates to such phosphors having improved emission and physical characteristics.

Yttrium oxide phosphors when activated with europium are bright red-emitting phosphors. Generally, however, it has been necessary to use above about 4 percent of europium as an activator to achieve proper color co-ordinates. This generally is done with a corresponding decrease in brightness.

The processes used, heretofore, for the production of these phosphors requires the fired cake to be subjected to several additional steps to convert the highly agglomerated fired cake to a usable phosphor. Additionally, the crushing and milling required results in the generation of a large quantity of fine particles which are not usable.

It is believed, therefore, that a red-emitting yttrium oxide phosphor having lower quantities of europium with a higher brightness and improved physical characteristics is an advancement in the art.

OBJECTS AND SUMMARY OF THE INVENTION

It is an object of this invention to provide an improved red-emitting cathodoluminescent yttrium oxide phosphor.

It is a further object of this invention to provide a yttrium oxide phosphor which has improved emission and physical properties.

It is an additional object of this invention to provide a more efficient process for producing an improved red-emitting cathodoluminescent yttrium oxide phosphor.

In accordance with one aspect of this invention there is provided a red-emitting cathodoluminescent yttrium oxide phosphor activated with less than 4 mole percent of europium and having from about 1 to about 6 percent by weight of sulfur based on the yttrium oxide as a dopant. In accordance with an additional aspect of this invention there is provided a process for producing an improved yttrium oxide phosphor comprising forming a substantially uniform blend of yttrium oxide and europium oxide, the amount of europium oxide being less than 4 moles per 100 moles of yttrium oxide and from about 1 to about 6 percent by weight of elemental sulfur based upon the yttrium oxide and firing the blend at at least about 2150° F for at least about 2 hours.

DESCRIPTION OF THE PREFERRED EMBODIMENTS

For a better understanding of the present invention, together with other and further objects, advantages, and capabilities thereof, reference is made to the following disclosure and appended claims.

The addition of the sulfur dopant enables the lower quantity of europium to be used, which enables a brighter emission of the desired color. Europium levels are below 4 mole percent and preferably from about 3 to about 3.5 mole percent. Additionally, the fired cake, instead of being highly sintered, is friable and requires only very light milling, which reduces the generation of fines. In addition, the crystalline structure of the phosphor is changed from irregular to spherical. The phosphor of this invention, in addition to having the foregoing quality improvement, is more economical since europium usage is reduced and the number of processing steps is reduced, with a higher yield of usable phosphor.

Essentially all of the sulfur is incorporated into the phosphor during the firing step. In the manufacture of yttrium oxide europium-activated phosphors a direct firing process can be useful in certain instances. Such a process has been disclosed in U.S. Pat. application, Ser. No. 126,957, filed Mar. 22, 1971 and assigned to the assignee of this present invention. Sulfur can be incorporated during the first or second firing step as disclosed therein and in the detailed examples herein.

It has further been found that due to the reduced europium content that the borate and lithium and sulfur can be incorporated into the yttrium oxide and europium oxide and all of the ingredient fired in one step and a satisfactory phosphor results. Firing temperatures are generally those used in the second step of those disclosed in the beforementioned co-pending application and given in Example II herein.

Essentially all of the sulfur charged is incorporated into the phosphor. The resulting phosphor os this invention, therefore, contains from about 1 to about 6 percent sulfur, less than about 4 mole percent of europium, is friable and has spherical crystals, thus is readily distinguished from the europium-activated yttrium oxide phosphors heretofore produced.

As previously mentioned from about 1 to about 6 percent by weight of sulfur based upon the yttrium oxide as a dopant is used. Less than about 1 percent of sulfur does not achieve the desired reduction of europium and more than about 6 percent tends to adversely effect the emission color, however, friable characteristics remain. From about 2.0 to about 5 percent weight of sulfur is preferred.

To further illustrate the subject invention, the following detailed example is presented. All parts, percentages and proportions are by weight unless otherwise indicated.

EXAMPLE I

About 430 grams (1.03 moles) of yttrium oxide and about 24.6 grams (0.07 mole) of europium oxides and about 4 grams of boric acid are blended together and heated to about 1650° F for about 2 hours. After cooling to ambient temperature the resulting material is blended with about 9 grams of sulfur and about 5.3 grams of lithium carbonate. This blend is heated for about 4 hours at about 2200° F. After cooling to room temperature the friable cake is milled for a short period and washed, filtered and dried according to prior art procedures. The sample designated as Sample I is taken for further analysis.

Substantially the same amount of yttrium oxide and about 31.7 grams (0.09 mole) of europium oxide are blended together with about 4 grams of boric acid. The blend is heated to about 1650° F for about 2 hours and after cooling to ambient temperature about 5.34 grams of lithium carbonate is blended with the fired mixture. The resulting blend is fired at about 2200° F for about 4 hours. The cake is highly agglomerated and it is necessary to roller crush and then ball mill before washing, filtering and drying. A sample designated as Sample II is taken for further analysis.

Comparative results between Samples I and II show that Sample I has less fines (material below about 3 microns) and the crystalline formation is spherical. Sample II contains about 20 percent more of material below about 3 microns.

Emission analysis indicates that color is essentially the same, however, Sample I has a brightness of about 114 versus a known $Y_2O_3$:Eu standard taken as 100 whereas Sample II has a brightness of about 104 percent compared against the same standard.

EXAMPLE II

Using essentially the same level of ingredients as in Example I except that 6 grams of sulfur are used instead of 9 grams as in Example I are blended together and fired for 4 hours at about 2150° F. Brightness of the phosphors is 112 percent of the same standard used in Example I Substantially similar brightness and friability results are achieved with a shift in color to a more orange is achieved with increasing sulfur content up to about 6 percent sulfur.

While there has been shown and described what are at the present considered the preferred embodiments of the invention, it will be obvious to those skilled in the art that various changes and modifications may be made therein without departing from the scope of the invention as defined by the appended claims.

What is claimed is:

1. A red-emitting cathodoluminescent phosphor composition consisting essentially of: yttrium oxide as a host, fluorescence activating proportions but less than 4 mole percent europium, as an activator, and from about 1 to about 6 percent by weight of sulfur based upon yttrium oxide chemically combined with said yttrium oxide.

2. A composition according to claim 1 wherein said sulfur is from about 2 to about 5 percent by weight.

3. A composition according to claim 2 wherein said europium is from about 3.0 to about 3.5 mole percent.

4. A process for producing a red-emitting cathodoluminescent phosphor composition comprising:
   a. forming a substantially uniform blend of yttrium oxide and europium oxide, said europium oxide being in fluorescence activating proportions but less than 4 moles per 100 moles of yttrium oxide and from about 1 to about 6 percent by weight of sulfur based upon said yttrium oxide, and
   b. firing said blend at a temperature of at least 2150° F for at least about 2 hours.

5. A process according to claim 4 wherein said yttrium oxide and said europium oxide are initially blended together with a borate source heated to at least about 1600° F and thereafter the resulting material is blended with said sulfur and a lithium source and heated to at least 2150° F for at least 2 hours.

6. A process according to claim 5 wherein said sulfur is from about 2 to about 5 percent by weight.

7. A process according to claim 6 wherein said europium oxide is from about 3.0 to about 3.5 moles per 100 moles yttrium oxide.

* * * * *